US012056141B1

(12) United States Patent
Daube

(10) Patent No.: US 12,056,141 B1
(45) Date of Patent: Aug. 6, 2024

(54) SYSTEMS AND METHODS FOR TRACING SOFTWARE APPLICATION ACTIVITY

(71) Applicant: Snap Inc., Santa Monica, CA (US)

(72) Inventor: Nir Daube, Kfar Yehoshua (IL)

(73) Assignee: Snap Inc., Santa Monica, CA (US)

( * ) Notice: Subject to any disclaimer, the term of this patent is extended or adjusted under 35 U.S.C. 154(b) by 173 days.

(21) Appl. No.: 15/673,148

(22) Filed: Aug. 9, 2017

Related U.S. Application Data

(60) Provisional application No. 62/372,317, filed on Aug. 9, 2016.

(51) Int. Cl.
G06F 16/25 (2019.01)
G06F 16/21 (2019.01)
G06F 16/23 (2019.01)
H04L 43/08 (2022.01)
H04L 67/306 (2022.01)
H04L 67/50 (2022.01)

(52) U.S. Cl.
CPC .......... *G06F 16/252* (2019.01); *G06F 16/219* (2019.01); *G06F 16/2358* (2019.01); *H04L 67/535* (2022.05); *H04L 43/08* (2013.01); *H04L 67/306* (2013.01)

(58) Field of Classification Search
CPC .. G06F 16/252; G06F 16/219; G06F 16/2358; H04L 67/535; H04L 43/08; H04L 67/306
See application file for complete search history.

(56) References Cited

U.S. PATENT DOCUMENTS

| | | | |
|---|---|---|---|
| 9,942,298 B2 * | 4/2018 | Nigam | G06F 16/972 |
| 2003/0204730 A1 * | 10/2003 | Barmettler | H04L 29/06 |
| | | | 713/181 |
| 2007/0294256 A1 * | 12/2007 | Averett | G06F 8/60 |
| 2014/0109084 A1 * | 4/2014 | Shen | G06F 8/61 |
| | | | 717/178 |
| 2014/0317303 A1 * | 10/2014 | Toprani | H04L 67/141 |
| | | | 709/227 |
| 2015/0215383 A1 * | 7/2015 | Sun | H04W 4/00 |
| | | | 709/203 |
| 2015/0262223 A1 * | 9/2015 | Brown | G06Q 30/0246 |
| | | | 705/14.45 |
| 2016/0283215 A1 * | 9/2016 | Chor | H04L 67/2814 |
| 2017/0085609 A1 * | 3/2017 | Clay | H04L 65/4069 |
| 2017/0212874 A1 * | 7/2017 | Urban | G06F 16/957 |

* cited by examiner

*Primary Examiner* — Mark D Featherstone
*Assistant Examiner* — Ranjit P Doraiswamy
(74) *Attorney, Agent, or Firm* — Schwegman Lundberg & Woessner, P.A.

(57) ABSTRACT

Various embodiments provide a tracing system or a tracing method that enables an installed software application to be launched with relevant data regarding a user's activity on the client device before installation of the software application. A tracing system of an embodiment may comprise one or more of a server including a database, a web page module configured to be integrated in a website, and an application module configured to be integrated in a software application.

19 Claims, 13 Drawing Sheets

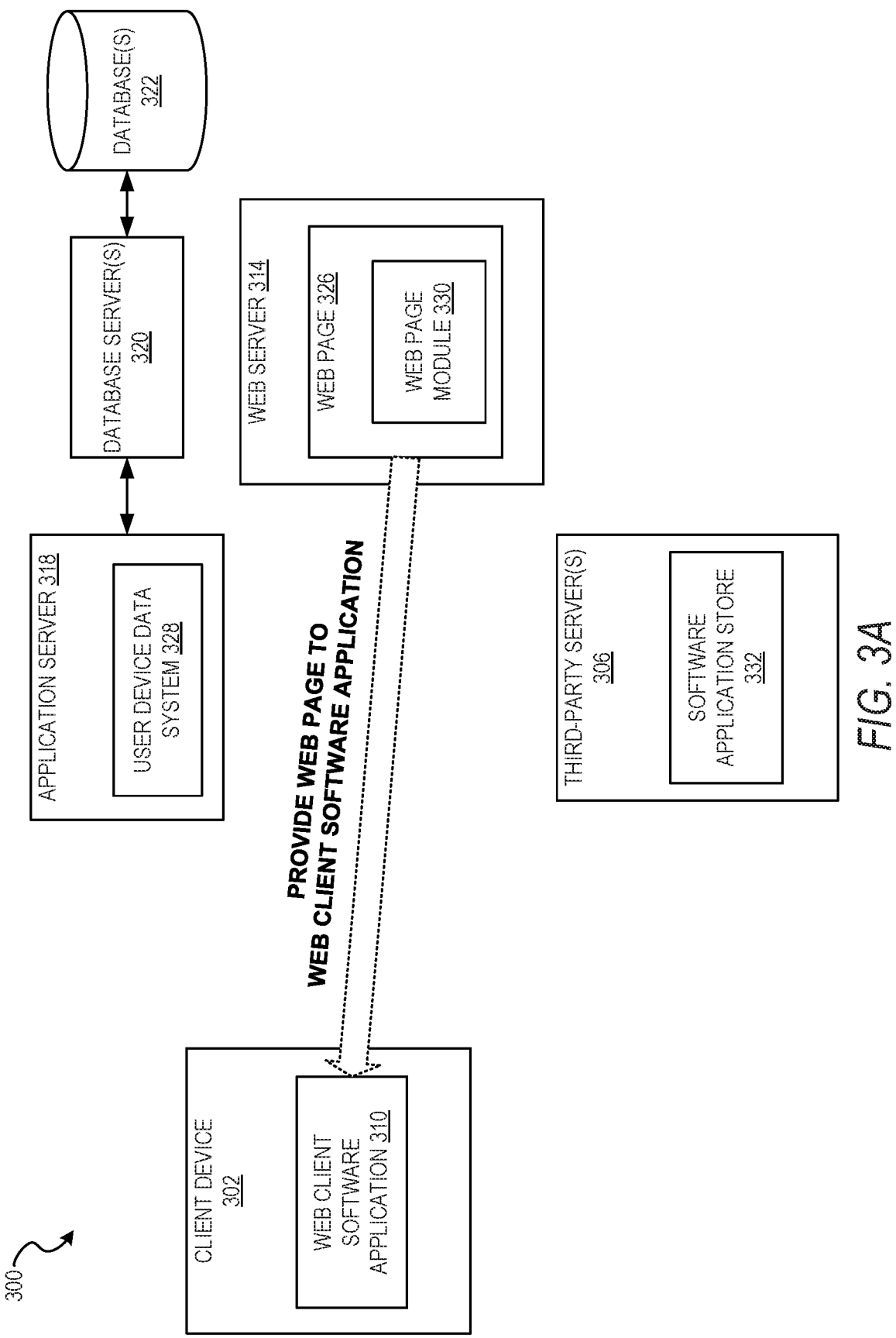

SYSTEMS AND METHODS FOR TRACING SOFTWARE APPLICATION ACTIVITY

CROSS-REFERENCE TO RELATED APPLICATION

This application claims priority to and the benefit of U.S. Provisional Patent Application No. 62/372,317, filed on Aug. 9, 2016, which is incorporated herein by reference.

TECHNICAL FIELD

Embodiments described herein relate to software applications and, more particularly, to systems, methods, devices, and instructions for launching software applications with predetermined data, such as relevant data regarding a user's activity before installation of the software application.

BACKGROUND

Today, a user browsing the Internet through a web client (e.g., web browser) may be requested to install a software application (e.g., one external to the web browser) on the user's client device to enable their access of certain features or certain content. Such a request may be facilitated by the user being directed in the web client to a web page for installing the software application. The web page may, for example, provide a hyperlink for downloading a software installation application for installing the software application, may cause an automatic download of the software installation application to the user's client device, or may cause the user to transition from the web client to a third-party software application store or marketplace (e.g., Google Play®, Apple® App Store®, Microsoft® Windows Store, etc.) from which the software application can be downloaded and installed on to the user's client device. Additionally, the web page may include an embedded software installation application that operates within the web client to install the software application on to the user's client device.

Unfortunately, once the user installs and launches the software application on the user's client device, the installed software application traditionally has no way of knowing what user activity on the client device, prior to the software application's installation, caused a request for installation of the software application on the user's client device. The user activity could include the user's attempt to activate, access, or execute a specific operation while browsing the Internet through a web client.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

FIGS. 3A-3E are block diagrams illustrating example data flow of a system for tracing software application activity, according to some embodiments.

DETAILED DESCRIPTION

Figure 1:
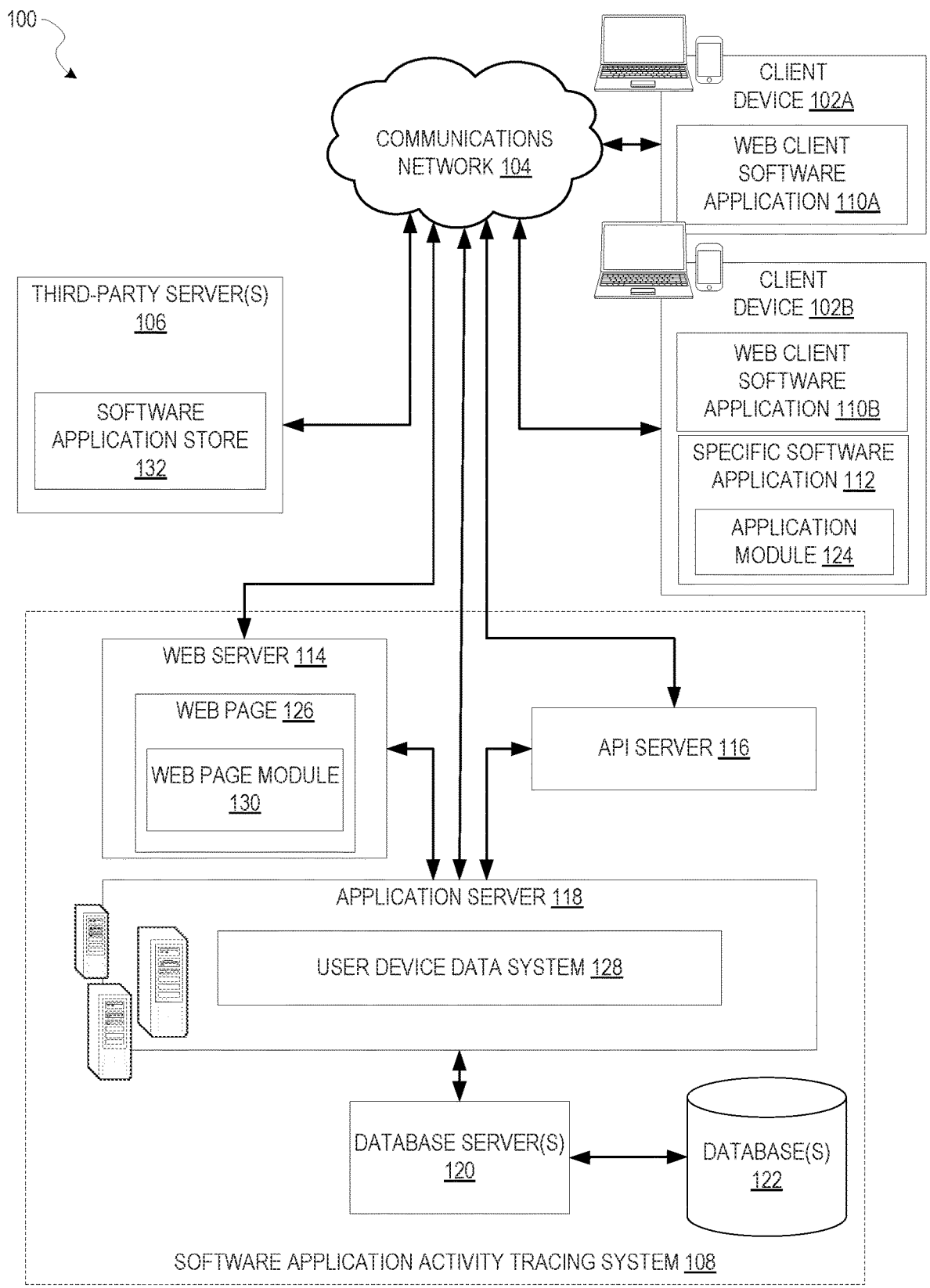
FIG. 1 is a block diagram illustrating an example high-level client-server-based network architecture that includes a software application activity tracing system, according to some embodiments.

Embodiments described herein relate to software applications and, more particularly, to systems, methods, devices, and instructions for launching software applications with predetermined data, such as relevant data regarding a user's activity before installation of the software application. Once a user installs and launches a software application on a user's client device, the installed software application traditionally has no way of knowing what user activity on the client device, prior to the software application's installation, caused a request for installation of the software application on the user's client device. Some embodiments described herein enable an installed software application to be launched and loaded with relevant data regarding a user's activity on the client device before installation of the software application. Before various embodiments described herein can capture recall relevant data regarding a user's activity, which would otherwise be lost if the software application was not already installed and available on the client device to perform an operation at the time of a user selection of the operation.

Various embodiments provide a tracing system or a tracing method that enables an installed software application to be launched with relevant data regarding a user's activity on the client device before installation of the software application. The tracing system comprising one or more of a server including a database, a web page module configured to be integrated in a website (e.g., included by a web page of a website), and an application module configured to be integrated in a software application.

According to some embodiments, the web page module connects with the database and is capable of adding, to the database, a record including an identifier associated with a client device and at least one parameter regarding an operation (e.g., user-selected operation) to be performed on the client device by the software application. Such a record may be added by the web page module in response to the web page module detecting that the software application intended to perform the operation is not installed on the client device, or that the software application intended to perform the operation is installed but unable to perform the operation on the client device (e.g., the wrong version of the software application is installed on the client device). The operation to be performed may include, without limitation: accessing media content (e.g., image, video, audio, three-dimensional model, etc.), which may relate to a retail item or product; accessing a social network system or accessing social networking content; or accessing an electronic messaging system or accessing electronic message content, which may relate to ephemeral messages (e.g., messages having content that is viewable for a predetermined time period or messages that are deleted a predetermined time period after viewing). The at least one parameter regarding the operation may describe or specify, without limitation, the operation to be performed by the software application (e.g., receive, open, or send electronic message content or view media content), minimum version level of the software application to perform the operation, data associated with performance of the operation (e.g., file path or a universal resource locator (URL) to a file or other resource that the operation will load), options or settings for the operation (e.g., terminate the software application after performance of the operation), or information regarding a user selection of the operation (e.g., URL to website that included the web page module 130, or time-stamp of the user selection of the operation).

According to some embodiments, the web page module detects an installation status of the software application (which is intended to perform the operation) in response to a user on the client device requesting the operation be performed (e.g., through a web client viewing a web page including web page module). As a result, the web page module may add the record to the database when the user requests the operation to be performed. For some embodiments, when the web page module detects that the software application is not installed on the client device, or is installed but unable to perform the operation on the client device, the web page module directs the client device (e.g., a web client thereon) to a resource that facilitates installation of the software application on the client device. Such a resource can include, without limitation, a software application store (e.g., Google Play®, Apple® App Store®, Microsoft® Windows Store, etc.) or web page including a link for downloading an installer for the software application.

Examples software applications (also referred to herein as "apps") that may be detected, installed, and launched by various embodiments include, without limitation, web browsers, book reader apps (e.g., operable to read e-books), media apps (e.g., operable to present various media forms including audio and video), social media network apps, messaging apps (e.g., ephemeral messaging apps), and electronic mail (e-mail) apps. For instance, the software application may comprise an ephemeral messaging software application, and an embodiment may be used to install the ephemeral messaging software application on a client device when a user, on the client device, attempts to open an ephemeral message the user received, but a software application capable of opening the received ephemeral device (e.g., the ephemeral messaging software application) is not installed on the client device. The user may be attempting to open the ephemeral message through a web page including a web page module described herein. Such a web page may be part of a website or may be included as e-mail content (e.g., Hypertext-Markup Language [HTML] content).

The identifier associated with the client device may comprise at least one network address associated with or assigned to the client device, such as a media access controller (MAC) network address, public Internet Protocol (IP) network address, a private IP network address (e.g., a local IP network address assigned to a client device behind a network router or a network gateway), or some combination thereof. For instance, the identifier associated with the client: may comprise a MAC network address (e.g., associated with a network interface of a client device); may comprise a public IP network address (e.g., the public IP network address associated with a single client device); and may comprise a public IP network address and a private IP network address (e.g., the public IP network address of a network router and a local IP network address assigned to a client device behind the network router). For some embodiments, the at least one parameter may be integrated with the identifier. For instance, the identifier may comprise at least one network address associated with or assigned to the client device and the at least one parameter.

For some embodiments, the application module is configured to be integrated into a version of the software application that can be installed and launched on the client device. In this way, the application module can enable the launched software application to obtain a parameter stored on the database. In particular, the application module can connect to the database, determine the identifier (e.g., public IP network address and private IP network address) of the client device on which the application module is operating, and search for the identifier in the database. Upon locating the identifier in the database, the application module can obtain, from the database, at least one parameter stored in association with the identifier. The at least one parameter may be the same one stored by the web page module (e.g., upon the web page module detecting that the software application was not installed on the client device, or that the software application was unable to perform the operation on the client device).

Once obtained, the application module can cause the software application, installed on the client device, to load the at least one parameter obtained from the database. In this way, the at least one parameter can cause the software application to perform an operation. The operation to be performed may be the same operation that was originally intended to be performed on the client device before the web page module detected that the software application was not installed, or unable to perform the operation, on the client device.

According to some embodiments, operation of the tracing system may comprise: providing a web page (e.g., of a website) comprising a web page module to a client device; receiving, by the web page module on the client device, a user's intent to perform the operation on the client device; adding, by the web page module on the client device, a record to a database (e.g., of a server) connected with the web page module, where the record includes an identifier (e.g., comprising at least one IP network address associated with the client device) and at least one parameter regarding the user-selected operation to be performed on the client device. As noted herein, the web page module may add the record in response to the web page module detecting that the software application to perform the user-selected operation on the client device is not installed, or is installed but otherwise unable to perform the user-selected operation.

Once the software application is installed on the client device (e.g., by a resource to which the client device is directed by the web page module), the installed software application may be launched. According to some embodiments, the installed software application includes an application module that, once the installed software application is launched on the client device: determines the identifier for the client device; connects to the database to which the web page module added the record; searches for the identifier on the database; once a record including the identifier is identified, obtains the at least one parameter stored in the record; and causes the installed software application to load the at least one parameter obtained from the record, which in turn, can cause the installed software application to perform the operation (e.g., the user-selected operation) associated with the at least one parameter.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example high-level client-server-based network architecture 100 that includes a software application activity tracing system 108, according to some embodiments. As shown, the network architecture 100 also includes a client device 102A and 102B (hereafter, collectively referred to as client devices 102), one or more third party servers 106, and a communications network 104 (e.g., the Internet or wide area network (WAN)) that facilitates data communication between the client devices 102, the third-party servers 106 and the software application activity tracing system 108. In the network architecture 100, the software application activity tracing system 108 can provide server-side functionality via the communications network 104 to the client devices 102. In some embodiments, a user (now shown) interacts with one of the client devices 102 and interacts with the third-party servers 106 or the software application activity tracing system 108 using one of the client devices 102.

A user of one of the client devices 102 may comprise a person, a machine, or other means of interacting with one of the client devices 102. In some embodiments, the user is not part of the network architecture 100, but interacts with the network architecture 100 via one of the client devices 102 or another means. For instance, the user provides input (e.g., touch screen input or alphanumeric input) to one of the client devices 102 and the input is communicated to the third-party servers 106 or the software application activity tracing system 108 via the communications network 104. In such an instance, the third-party servers 106 or the software application activity tracing system 108, in response to receiving the input from the user, communicates information to the particular client device via the communications network 104 to be presented to the user. In this way, the user can interact with the third-party servers 106 or the software application activity tracing system 108 using one of the client devices 102.

The client devices 102 may comprise a computing device that includes at least a display and communication capabilities that provide communications with the third-party server 106 and the software application activity tracing system 108 via the communications network 104. Each of the client devices 102 may comprise, without limitation, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game console, set-top box, network personal computer (PC), mini-computer, and so forth. Depending on the embodiment, at least one of the client devices 102 may comprise one or more of a touch screen, accelerometer, gyroscope, biometric sensor, camera, microphone, Global Positioning System (GPS) device, and the like.

The client devices 102, the third-party servers 106, and the software application activity tracing system 108 may communicate with the communications network 104 via a wired or wireless network connection. One or more portions of the communications network 104 may comprise an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some embodiments, each of the client devices 102 includes one or more of software applications, which can include, without limitation, web browsers, book reader apps (e.g., operable to read e-books), media apps (e.g., operable to present various media forms including audio and video), social media network apps, messaging apps (e.g., ephemeral messaging apps), and electronic mail (email) apps. For instance, a specific software application 112 on the client device 102B may comprise a messaging client software application, which can be communicatively coupled to other instances of the messaging client application on other client devices or to a messaging server system (e.g., included by the application server 118) via the communications network 104 (e.g., the Internet). For some embodiments, the specific software application 112 represents a software application that, once installed on a client device (e.g., on the client device 102B), can be used by the client device to perform, or the performance of, an operation selected by a user at the client device.

FIG. 1 illustrates the client device 102A as including a web client software application 110a (e.g., a web browser), and the client device 102B as including a web client software application 110b and the specific software application 112. For purposes of this description, the specific software application 112 can be considered to be installed and operable on the client device 102B to perform an operation (e.g., selected by a user at the client device 102B), while the client device 102A does not have a copy of the specific software application 112 installed and, as such, is unable to perform the same operation (e.g., when selected to do so by a user at the client device 102A). During operation, the web clients 110, and the specific software application 112 on the client device 102B, may interface with the third-party server 106 or the software application activity tracing system 108. Although FIG. 1 illustrates two client devices 102, in other embodiments, the network architecture 100 can comprise more or less than two client devices 102.

In FIG. 1, the third-party servers 106 comprise a software application store 132. The software application store 132, or some other resource included by the third-party servers 106 but not shown, may interact with one or more of the client devices 102 to facilitate installation of one or more software applications on the client devices 102. For instance, the software application store 132 may facilitate installation of a copy of the specific software application 112 on the client device 102A. A user (not shown) on one of the client devices 102 may access the software application store 132 via a web client or some other software application installed on the client device, such as a software application dedicated to accessing the software application store 132. The software application store 132 can include, without limitation, Google Play®, Apple® App Store®, and Microsoft® Windows Store. Access to a particular software application store by a client device may be dependent on, for example, an operating system of the client device or a software ecosystem supported by a client device. Another or alternative resource for facilitating installation of one or more software applications on the client devices 102 can include, without limitation, a web page that includes a link for downloading an installer for the software application or that automatically initiates download of the installer to a client device.

As shown, the software application activity tracing system 108 includes a web server 114 and an Application Program Interface (API) server 116, an application server 118, one or more database servers 120, and one or more databases 122. Each of the web server 114 and the API server 116 are coupled to, and can provide web and programmatic interfaces respectively to, the application server 118. Additionally, the web server 114 includes (e.g., hosts) a web page 126, which may be associated with a website and which can be provided to one of the client devices 102 upon request, such as when the web page 126 is visited by one of the client devices 102 via its web client software application. The application server 118 is communicatively coupled to the database servers 120, which facilitates access to one or more information storage repositories, such as the databases 122. According to various embodiments, the databases 122 store data associated with software application activity tracing system 108, such as records comprising client device identifiers and parameters for operations selected by users on client devices.

In FIG. 1, the specific software application 112 installed on the client device 102B comprises an application module 124, the web page 126 included by the web server 114 comprises a web page module 130, and the application server 118 includes a user device data system 128. In addition to the user device data system 128, the application server 118 can additionally host a number of subsystems or applications, which can comprise one or more modules or applications and each of which can be embodied as hardware, software, firmware, or any combination thereof. In some embodiments, the databases 122 are accessed by the web page module 130 and the application module 124 via the user device data system 128.

For some embodiments, the web page module 130 is configured to be integrated into a website, such as by being included by the web page 126 that can be received and viewed by a web client software application (e.g., 110A) on one of the client devices 102 (e.g., 102A). The website (e.g., the web page 126) may define at least one operation configured to be performed using a specific software application. The web page module 130 may be activated when a user selects to perform the at least one operation (e.g., view or access media content or electronic message content). Upon activation, the web page module 130 may perform one or more of the following operations. If the web page module 130 detects that the specific software application enabling (e.g., supporting) performance of an operation (e.g., user-selected operation) is already installed on the client device (e.g., 102B), the web page module 130 may activate the specific software application (e.g., 112) and cause it to perform the operation.

If the web page module 130 detects the specific software application is not installed on the client device (e.g., 102A), the web page module 130 may send the client device (e.g., the web client on the client device) to a resource, such as another web page or a software application store, for installing the specific software application on the client device. Alternatively, a user at the client device may manually search for an installer for the specific software application, obtain the installer, and use the installer to install the specific software application on the client device.

Additionally, if the web page module 130 detects the specific software application is not installed on the client device (e.g., 102A), the web page module 130 may determine an identifier associated with (e.g., IP network address assigned to) the client device for the client device, connect to the databases 122 (by way of the user device data system 128 and the database servers 120), and add a record comprising the identifier and at least one parameter regarding an operation (e.g., user-selected operation) to be performed on the client device. The at least one parameter regarding the operation may be captured by the web page module 130 when a user selects to perform the operation. As noted herein, the identifier can comprise at least one network address associated with (e.g., IP network address assigned to) the client device. Alternatively, the identifier associated with the client device and the at least one parameter may be combined together (e.g., concatenated together, into a user identifier), such as a single character string, that is added to the databases 122 as a record. In such an instance, the single character string may be searchable on the databases 122 by the identifier portion of the single character string. The record may be added by the web page module 130 when a user requests the operation, associated with the at least one parameter, be performed on the client device. The request to perform the operation may be received by the web page module 130 or may be otherwise detected by the web page module 130.

For various embodiments, the application module 124 is configured to be integrated into a specific software application (e.g., 112) that can be installed and launched on a client device (e.g., 102B) to perform an operation (e.g., user-selected operation) on the client device. Accordingly, the application module 124 may perform one or more of its operations when a specific software application (e.g., 112) including the application module 124 is installed and launched on the client device.

In particular, once the installed specific software application is launched, the application module 124 may detect whether any parameters were provided to the specific software application during its launch. If the application module 124 does not detect any parameters provided, the application module 124 may perform one or more of the following operations. Alternatively, the specific software application may detect whether any parameters were provided at the specific software application's launch and, in detecting the absence of parameters, may activate the application module 124 to perform one or more of the following operations.

The application module 124 can determine an identifier associated with (e.g., IP network address assigned to) the client device (e.g., 102B), the application module 124 can connect to the databases 122 (by way of the user device data system 128 and the database servers 120), and search for a record on the databases 122 based on an identifier associated with (e.g., IP network address assigned to) the client device (e.g., 102B). If the record is located on the databases 122, the application module 124 can obtain from the record at least one parameter regarding an operation (e.g., user-selected operation) to be performed on the client device. Once obtained from the record, the at least one parameter may be provided to (e.g., loaded by) the specific software application that includes the application module 124. This in turn may cause the specific software application to perform the operation associated with the at least one parameter and, additionally, to perform the operation in accordance with the at least one parameter (e.g., specific information provided by the at least one parameter). In this way, the at least one parameter, obtained by the application module 124, can cause the specific software application on the client device to perform an operation based on a user selection of that operation, where the user selection was received by the client device before the installation of the specific software application on the client device. Before various embodiments described herein, information provided by the at least one parameter would have been lost if the specific software application was installed and available on the client device to perform the operation prior to the user selection.

In an embodiment where the identifier associated with the client device and the at least one parameter are combined together (e.g., into a single user identifier) and stored on the databases 122 as a single character string, the application module 124 can determine an identifier associated with (e.g., IP network address assigned to) the client device (e.g., 102B), connect to the databases 122 (by way of the user device data system 128 and the database servers 120), and search for a user ID on the databases 122 based on the determined identifier associated with the client device. If the user ID is located on the databases 122, the application module 124 can extract from the user ID at least one parameter regarding an operation (e.g., user-selected operation) to be performed on the client device. Once extracted from the user ID, the at least one parameter may be provided to (e.g., loaded by) the specific software application that includes the application module 124.

Some embodiments may be implemented differently from what is illustrated in FIG. 1 (e.g., with more or less components or have a different arrangement). For instance, in an alternative embodiment, the user device data system 128, the databases 122, the webpage module 130, and the application module 124 constitute a software application activity tracing system. Additionally, while the network architecture 100 shown in FIG. 1 employs a client-server architecture, some embodiments are not limited to such an architecture, and can be implemented using a distributed, or peer-to-peer, architecture system, for example.

FIG. 2 and FIG. 4-7 are flowcharts illustrating example methods for tracing software application activity, according to various embodiments. It will be understood that example methods described herein may be performed by a device, such as a computing device, in accordance with some embodiments. Additionally, example methods described herein may be implemented in the form of executable instructions stored on a computer-readable medium or in the form of electronic circuitry. For instance, one or more operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
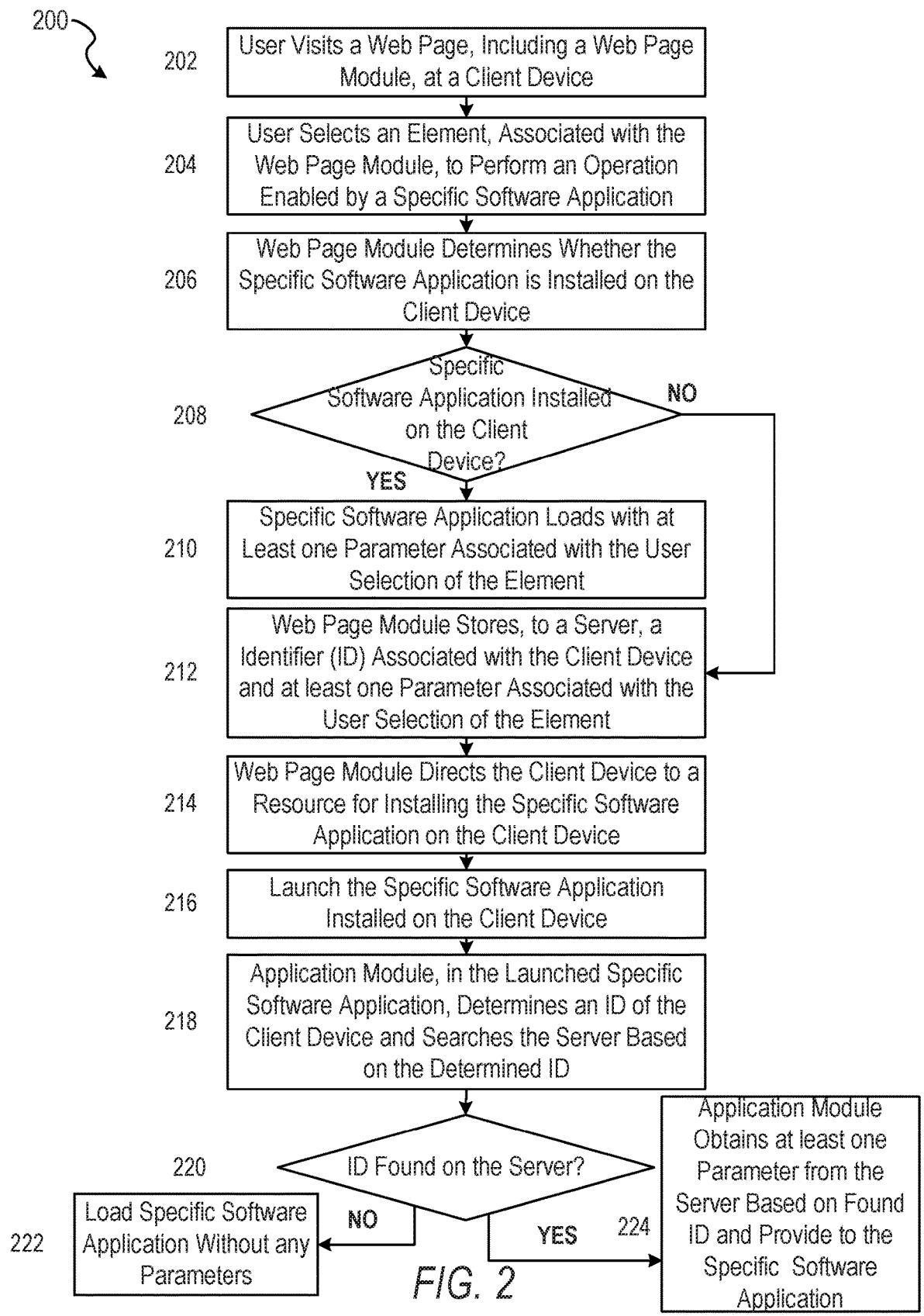
FIG. 2 is a flowchart illustrating an example method for tracing software application activity, according to various embodiments.

FIG. 2 is a flowchart illustrating an example method 200 for tracing software application activity, according to some embodiments. As shown, the method 200 begins at operation 202, with a web page (e.g., 126) that includes a web page module (e.g., 130) being provided to a client device (e.g., 102A). This may occur when a user at the client device visits the web page. From operation 202, the method 200 continues to operation 204, where a user selects an element, associated with the web page module, to perform an operation enabled by a specific software application (e.g., 112). From operation 204, the method 200 continues to operation 206, where the web page module determines whether the specific software application is installed on the client device (e.g., 102A). The method 200 continues to operation 208, where if the specific software application is determined to be installed on the client device, the method 200 continues to operation 210, and if the specific software application is determined to not be installed on the client device, the method 200 continues to operation 212. At operation 210, the specific software application installed on the client device is loaded with at least one parameter associated with the user selection of the element associated with the web page module.

Alternatively, at operation 212, the web page module (e.g., 130) stores, to a server (e.g., the database server 120) an identifier (ID) associated with the client device and at least one parameter associated with the user selection of the element. From operation 212, the method 200 continues to operation 214, where the web page module directs the client device to a resource for installing the specific software application on the client device. Subsequent to operation 214, the specific software application may be installed on the client device by the resource (e.g., website or software application store) or, alternatively, by the user manually searching for an installer for the specific software application and using the installer to install the specific software application on the client device.

After installation of the specific software application on the client device, the method 200 continues with operation 216, where the installed specific software application is launched on the client device. The specific software application installed on the client device may be launched by the user or, alternatively, by the web page module (e.g., 130) in response to the web page module detecting installation of the specific software application. From operation 216, the method 200 continues to operation 218, where an application module (e.g., 124), included by the installed specific software application, is launched on the client device. The application module can determine (e.g., detects) an identifier of the client device and search a server (e.g., the database server 120) based on the determined identifier. The method 200 continues to operation 220 where, if the ID is found on the server, the method 200 continues to operation 224, and if the ID is not found on the server, the method 200 continues to operation 222. At operation 222, the specific software application installed on the client device loads without any parameters.

Alternatively, at operation 224, the application module (e.g., 124) included by the installed specific software application obtains at least one parameter from the server (e.g., the database server 120) based on the found ID, and provides the at least one parameter to the specific software application. According to some embodiments, the specific software application loads the at least one parameter, which causes the specific software application to perform the operation based on the element selected by the user at operation 204.

FIGS. 3A-3E are block diagrams illustrating example data flows for a system 300 for tracing software application activity, according to some embodiments. As shown, the system 300 includes a client device 302, one or more third-party servers 306, a web server 314, an application server 318, one or more database servers 320, and one or more databases 322. As also shown, the client device 302 includes a web client software application 310, the third-party servers 306 include a software application store 332, the web server 314 includes a web page 326 having a web page module 330, and the application server 318 includes a user device data system 328. According to some embodiments, the client device 302, the third-party servers 306, the web server 314, the application server 318, the database servers 320, and the databases 322 are respectively similar to the client device 102, the third-party servers 106, the web server 114, the application server 118, the database server 120, and the databases 122 described above with respect to FIG. 1. Additionally, the web client software application 310, the software application store 332, the web page 326, the web page module 330, and the user device data system 328 may be respectively similar to the web client software application 110*a*/110*b*, the software application store 132, the web page 126, the web page module 130, and the user device data system 128 described above with respect to FIG. 1.

Figure 3B:
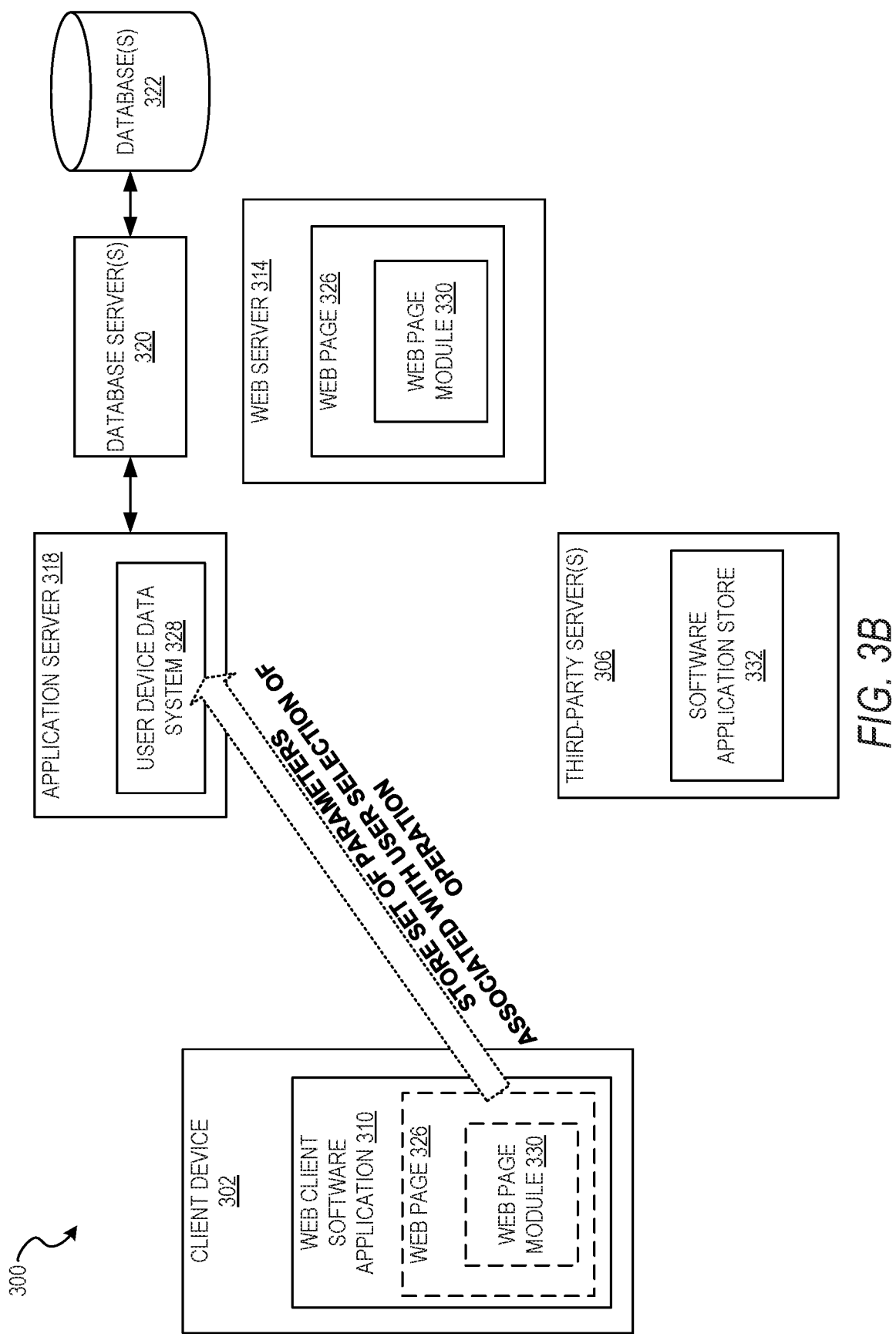

Referring now to FIG. 3A, during operation of the system 300, the web server 314 provides the web page 326 to the web client software application 310. As noted herein, this may occur when a user at the client device 302 visits a website that includes the web page 326. Referring now to FIG. 3B, the user may view the web page 326 through the web client software application 310 and, through the web page module 330 of the web page 326, the user may select to perform an operation that is to be performed by a specific software application on the client device 302. Upon user selection to perform the operation, the web page module 330 may detect that the specific software application is not installed on the client device 302. In response to detecting that the specific software application is not installed on the client device 302, the web page module 330 may store a set of parameters associated with the user selection of the operation to the user device data system 328. This may cause the user device data system 328 to store the set of parameters on the databases 322, which the user device data system 328 accesses through the database servers 320. According to some embodiments, the set of parameters may be stored in association with an identifier determined by the web page module 330 for the client device 302.

Figure 3C:
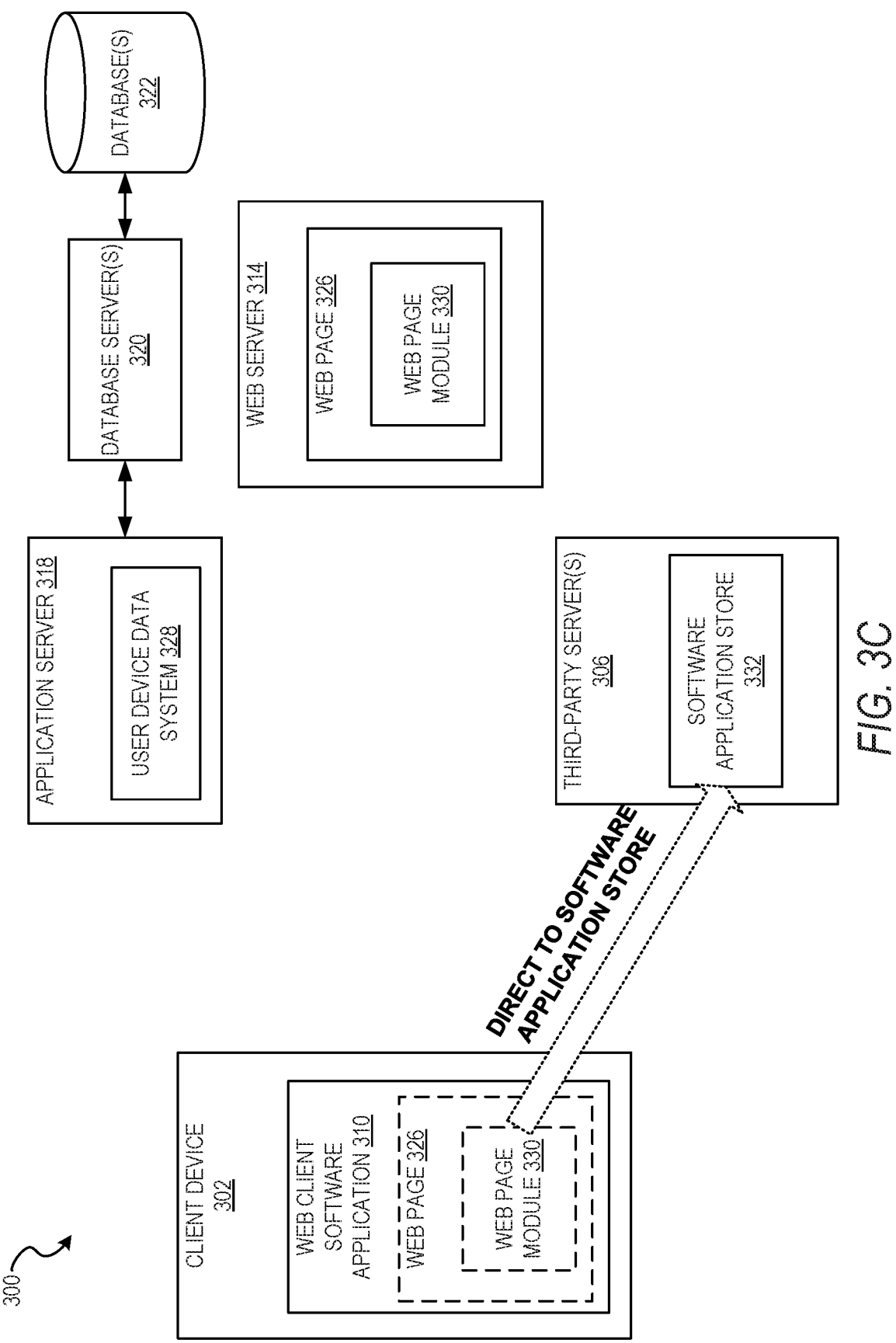
Figure 3D:
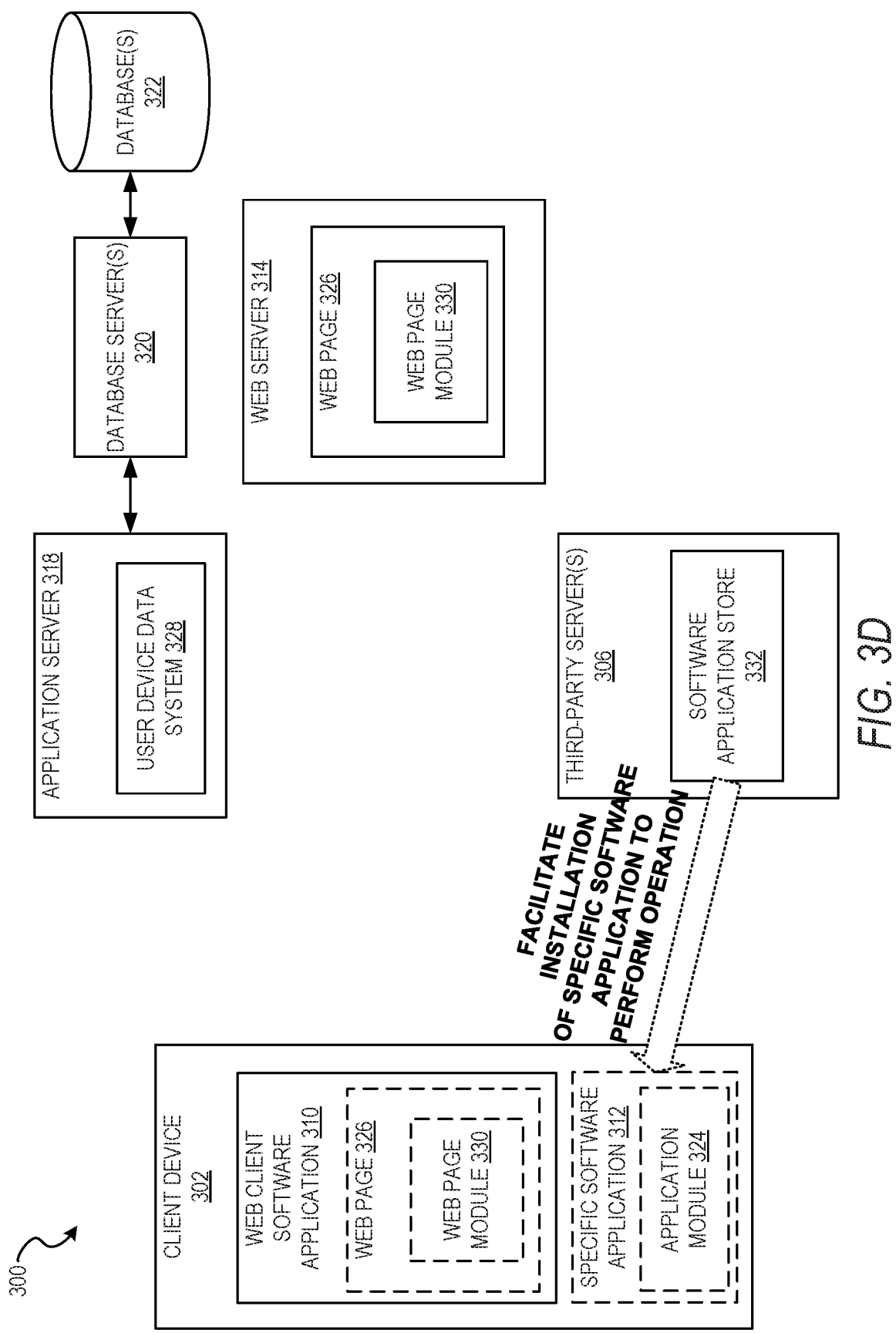

Referring now to FIG. 3C, in response to detecting that the specific software application is not installed on the client device 302, the web page module 330 also causes the web client software application 310 to be directed to the software application store 332 hosted on the third-party servers 306, or some other resource not shown, which can facilitate installation of the specific software application on the client device 302. Accordingly, referring now to FIG. 3D, the software application store 332 facilitates installation of the specific software application on the client device 302 to perform the operation previously selected by the user through the web page module 330. As shown, the specific software application 312 installed on the client device 302 includes an application module 324. According to some embodiments, the specific software application 312 and the application module 324 are respectively similar to the specific software application 112 and the application module 124 described above with respect to FIG. 1.

Figure 3E:
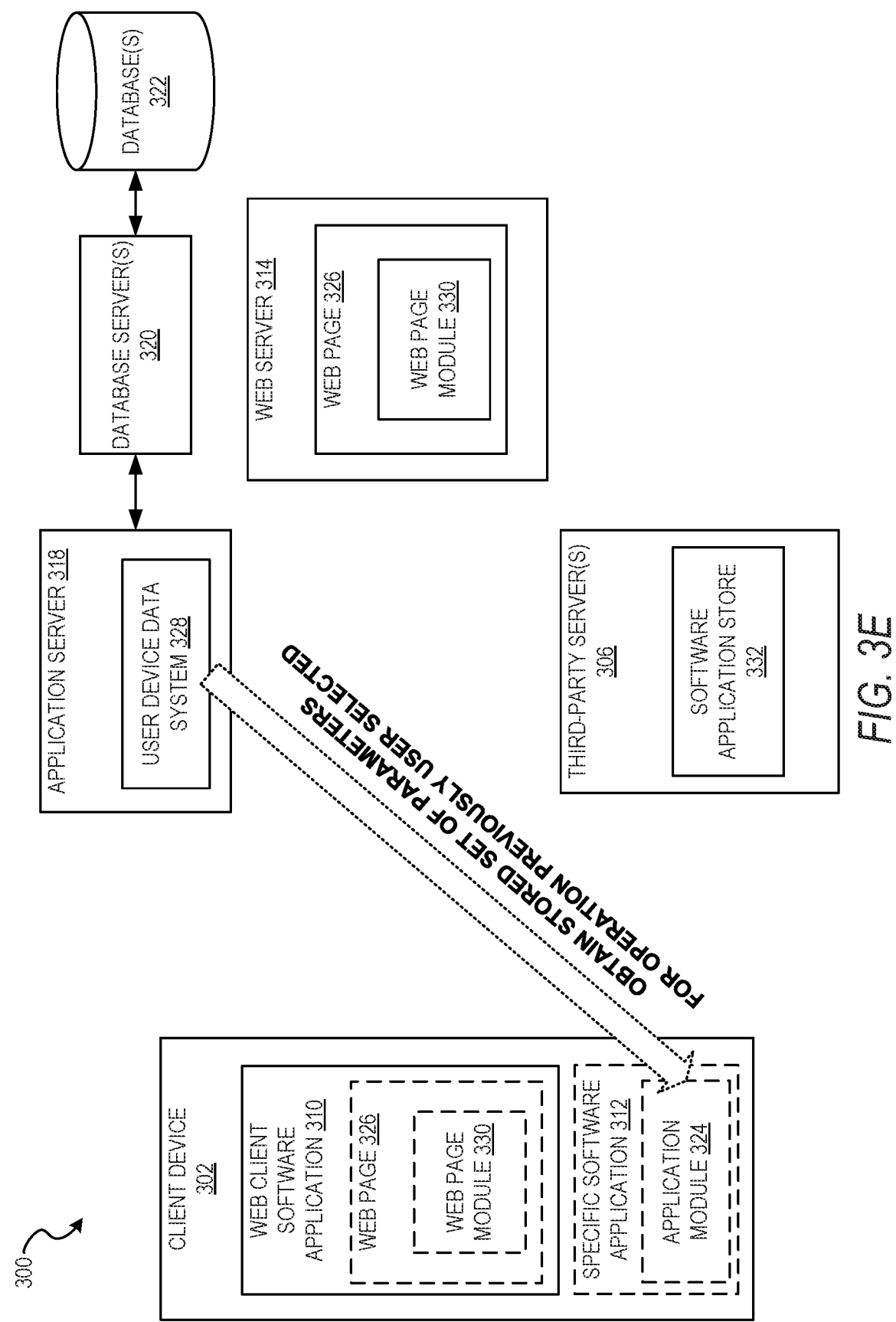

Referring now to FIG. 3E, once the specific software application 312 is installed on the client device 302 is launched, the application module 324 obtains a set of parameters, stored by the user device data system 328, for the operation previously selected by the user through the web page module 324. Subsequently, the specific software application 312 can receive (e.g., load) the obtained set of parameters and perform the operation in accordance with the set of parameters.

Figure 4:
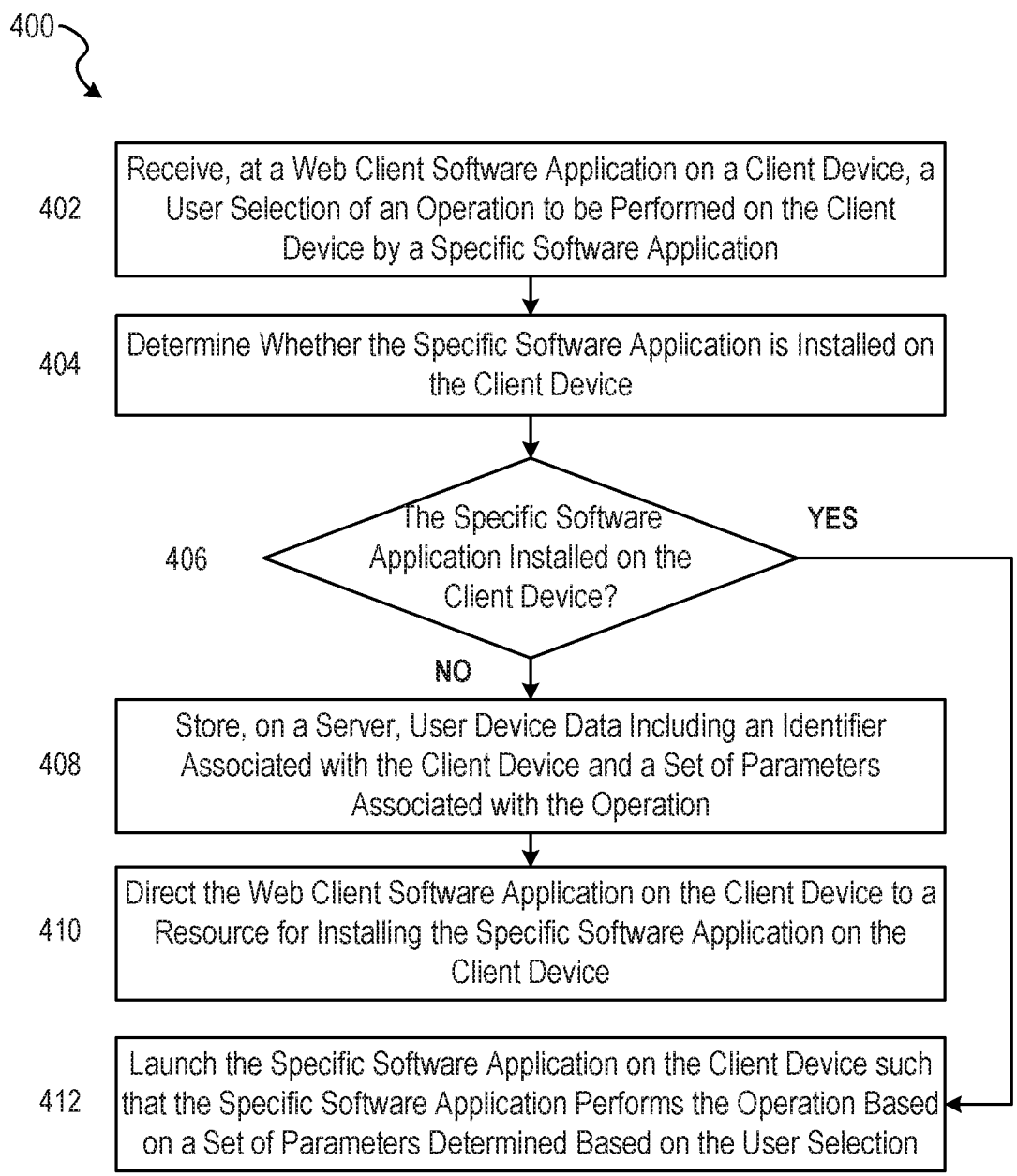
FIG. 4-7 are flowcharts illustrating example methods for tracing software application activity, according to various embodiments.

FIG. 4 is a flowchart illustrating an example method 400 for tracing software application activity, according to some embodiments. Depending on the embodiment, the method 400 may be performed by a client device (e.g., 102A). As shown, the method 400 begins with operation 402 with a web client software application, on a client device, receiving a user selection of an operation to be performed on the client device by a specific software application. As noted herein, the user selection may be received or detected by a web page module included by a web page of a website. The web page may be received by the web client software application over a network connection established between the client device and a web server, which may be part of the software application activity tracing system (e.g., 108).

The method 400 continues with operation 404 determining whether the specific software application, to perform the operation on the client device, is installed on the client device. Operation 404 may be performed by the web page module. The method 400 continues with operation 406, where if the specific software application is installed on the client device, the method 400 continues to operation 412 and where if the specific software application is not installed on the client device, the method continues to operation 408. At operation 412, the specific software application on the client device launches on the client device such that the specific software application performs the operation based on a set of parameters determined based on the user selection.

At operation 408, user device data, including an identifier associated with the client device and a set of parameters associated with the operation, are stored on a server. In this way, operation 408 permits future retrieval of the set of parameters from the server after the specific software application is installed on the client device. The user device data may be stored on the server over a network connection established between the client device and a user device data system (e.g., 128) operating on the server. The identifier may be one determined by operation 408, which may such determined based on hardware or software attributes, characteristics, or settings of the client device. The identifier may be one uniquely associated with the client device, such as a MAC network address, or one uniquely associated with the client address for at least a certain time period, such a public IP network address assigned to the client device. The set of parameters may be determined based on the user selection of the operation received at operation 402. For instance, the received user selection may comprise selection of viewing media content (e.g., augmented reality content), located at a URL, that is viewable by the specific software application. In this instance, the set of parameters may specify one or more of the viewing operation, the type of media content being viewed, the URL to the media content, and the version of the specific software application to perform the viewing operation. As noted herein, the identifier and the set of parameters may be combined together into a single character string (e.g., user ID) within the user device data, and is stored on the server as such.

From operation 408, the method 400 continues with operation 410 directing (or redirecting) the web client software application on the client device to a resource for installing the specific software application on the client device. As noted herein, the resource may comprise a software application store or a website that facilitate download of an installer for the specific software application.

Figure 5:
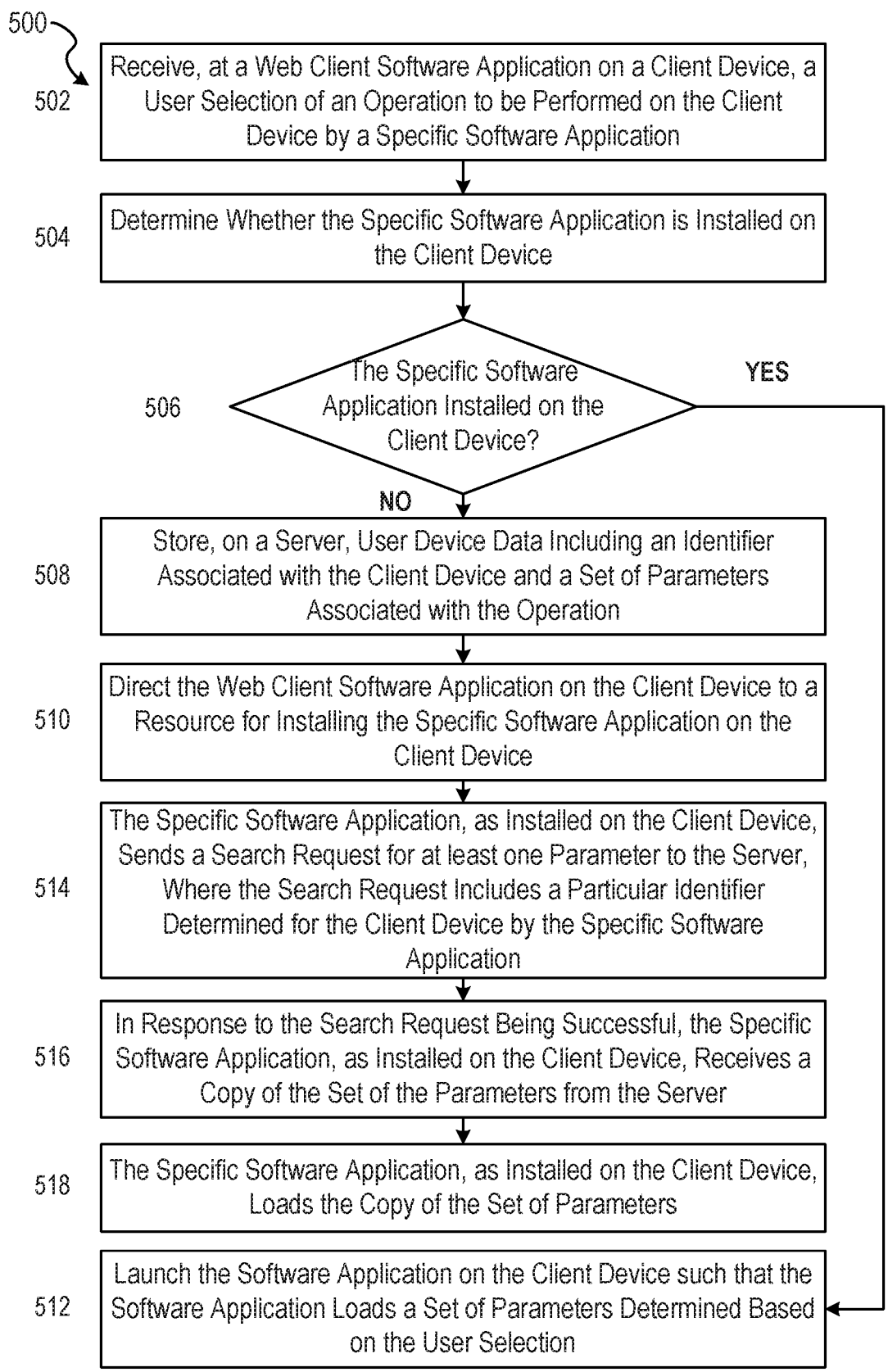

FIG. 5 is a flowchart illustrating an example method 500 for tracing software application activity, according to some embodiments. Depending on the embodiment, the method 500 may be performed by a client device (e.g., 102A). As shown, the method 500 begins with operation 502 and continues with operations 504, 506, 508, and 510. According to some embodiments, operations 502-510 are respectively similar to operations 402-410 described above with respect to the method 400 of FIG. 4.

From operation 510, the method 500 continues with operation 514 sending a search request, by the specific software application installed on the client device, to the server, where the search request includes a particular identifier determined for the client device by the specific software application. The method 500 continues with operation 514 once the specific software application is installed on the client device and is launched. Additionally, operation 514 may send a search request after detecting that any parameters being provided to the specific software application when the specific software application is launched.

From operation 514, the method 500 continues with operation 516 receiving, by the specific software application installed on the client device, a copy of the set of parameters from the server in response to the search request being successful. The copy of the set of parameters is received in a record result associated with the particular identifier, or received in a single character string combining the particular identifier and the set of parameters.

From operation 516, the method 500 continues with operation 518 loading the copy of the set of parameters by the specific software application. As noted herein, by the loading the copy of the set of parameters, the specific software application may perform the operation, selected at operation 502, in accordance with the copy of the set of parameters.

Figure 6:
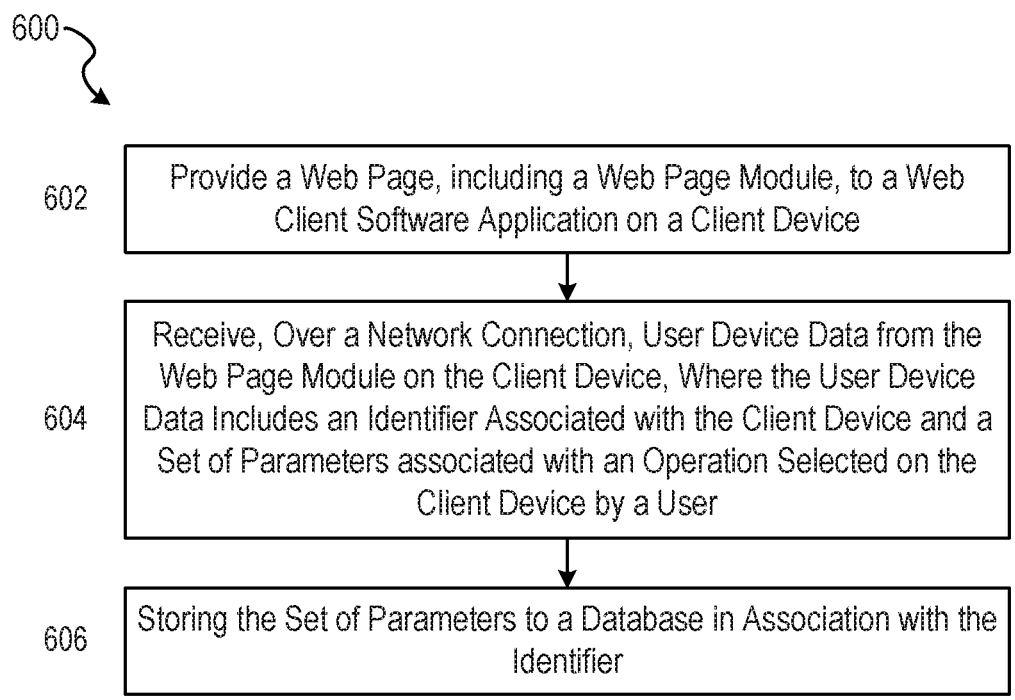

FIG. 6 is a flowchart illustrating an example method 600 for tracing software application activity, according to some embodiments. Depending on the embodiment, the method 600 may be performed by software application activity tracing system (e.g., 108). As shown, the method 600 begins with operation 602 provide a web page, including a web page module, to a web client software application on a client device. The web page may be provided over a network connection established between the device operating the method 600 and the client device.

The method 600 continues with operation 604 receiving, over a network connection, user device data from the web page module on the client device. The user device data can include an identifier associated with the client device and a set of parameters associated with an operation selected on the client device by the user. As noted herein, the identifier may be one uniquely associated with the client device, such as a MAC network address, or one uniquely associated with the client address for at least a certain time period, such a public IP network address assigned to the client device. The method 600 continues with operation 606 storing, to a database, the set of parameters in association with the identifier. As noted herein, the identifier and the set of parameters may be combined together into a single character string (e.g., user ID) within the user device data, and may be stored (in a database) as such by operation 606.

Figure 7:
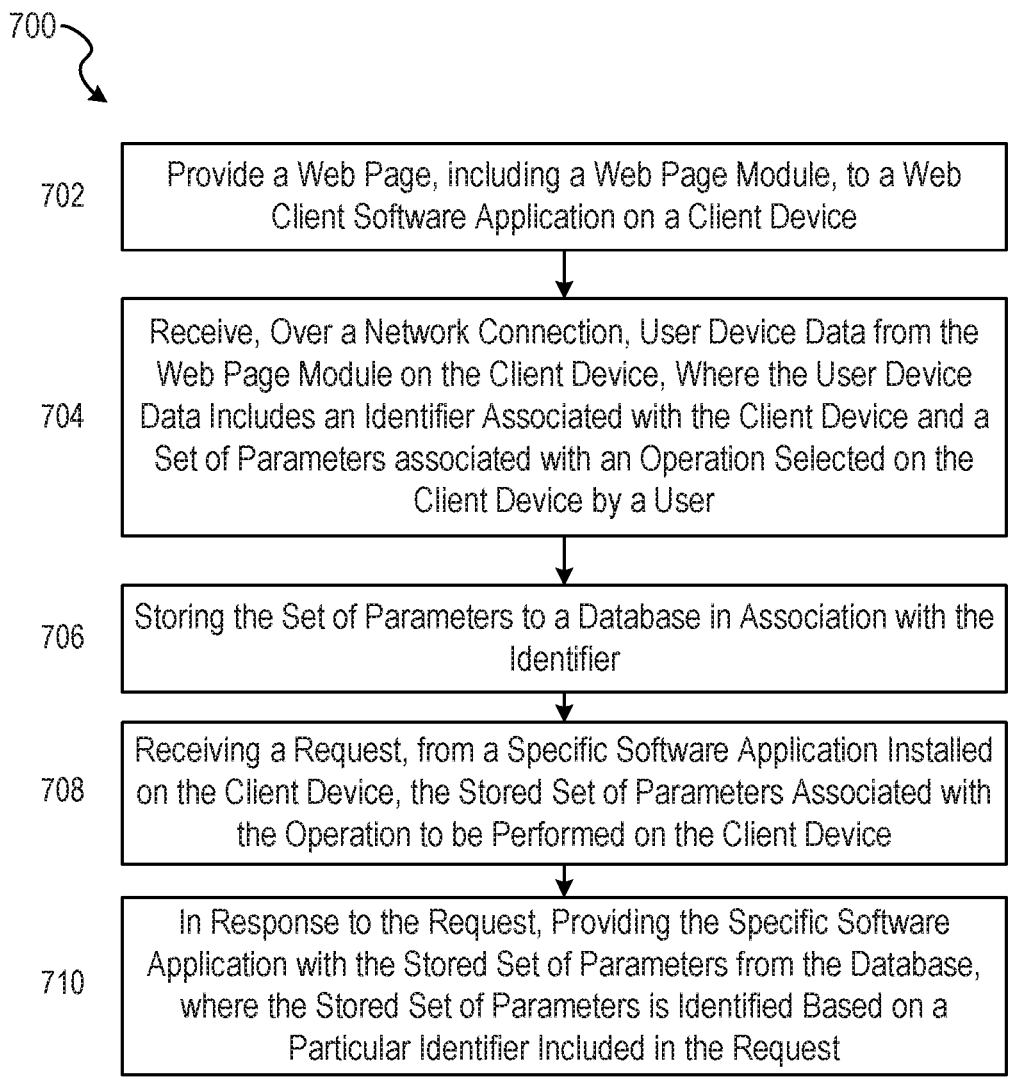

FIG. 7 is a flowchart illustrating an example method 700 for tracing software application activity, according to some embodiments. Depending on the embodiment, the method 700 may be performed by software application activity tracing system (e.g., 108). As shown, the method 700 begins with operation 702 and continues with operations 704 and 706. According to some embodiments, operations 702-706 are respectively similar to operations 602-606 described above with respect to the method 600 of FIG. 6.

From operation 706, the method 700 continues with operation 708 receiving a request, from a specific software application (e.g., application module included by the specific software application) installed on the client device, the stored set of parameters associated with the operation to be performed on the client device. From operation 708, the method 700 continues with operation 710 providing the specific software application with the stored set of parameters from the database. As noted, the stored set of parameters is identified based on a particular identifier included in the request received by operation 708. Operation 710 may provide the client device with the stored set of parameters from the database by retrieving, from the database, the stored set of parameters based on the particular identifier included by the request. Subsequently, operation 710 can send the retrieved set of parameters to the specific software application installed on the client device. Operation 710 may send the retrieved set of parameters by itself, within a record result (which may include the particular identifier), or as a single character string the combines the particular identifier with the stored set of parameters.

Software Architecture

Figure 8:
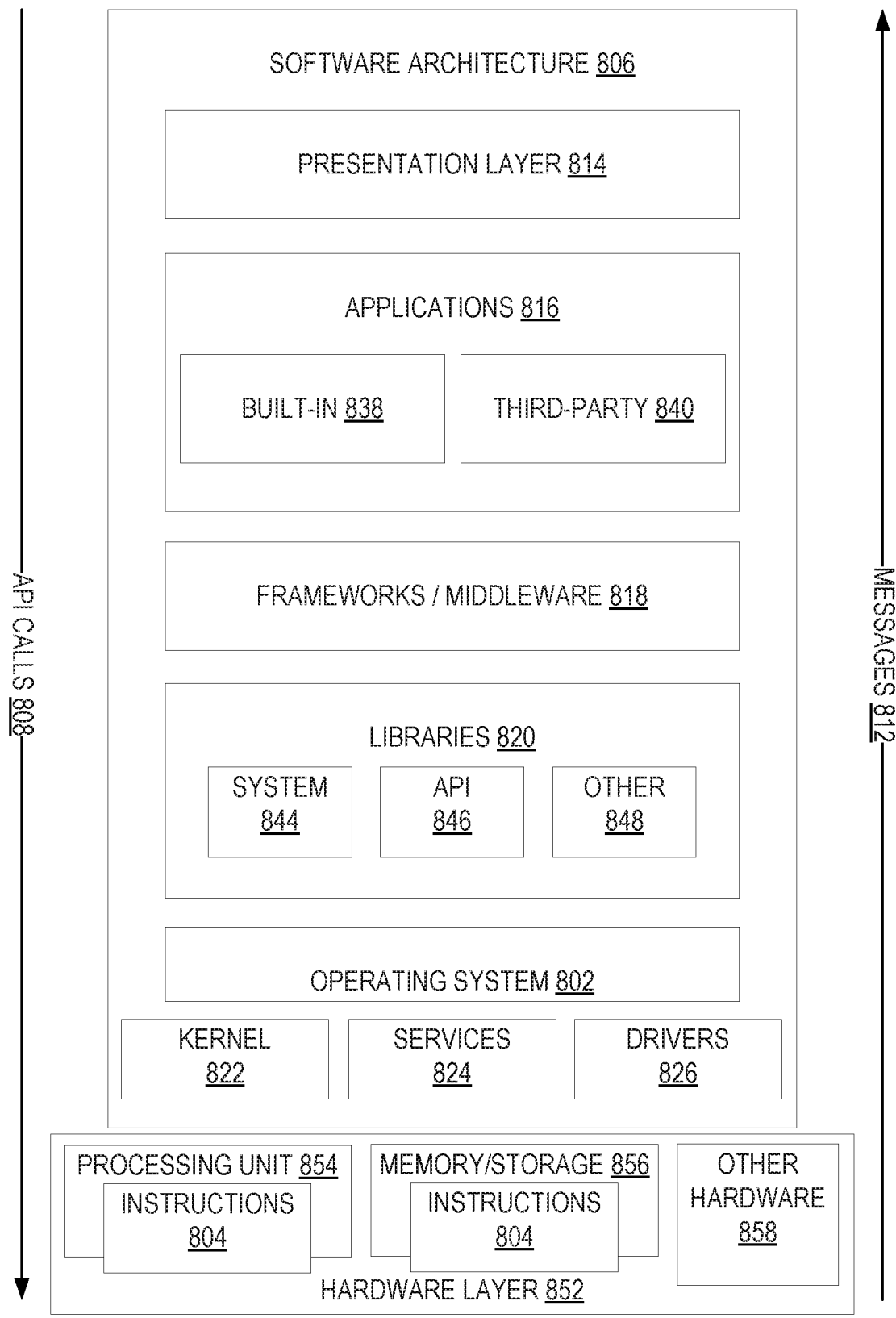
FIG. 8 is a block diagram illustrating a representative software architecture, which may be used in conjunction with various hardware architectures herein described to implement an embodiment.

FIG. 8 is a block diagram illustrating an example software architecture 806, which may be used in conjunction with various hardware architectures herein described to implement an embodiment. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, middleware 818, applications 816 and a presentation layer 814. Operationally, the applications 816 and/or other components within the layers may invoke application programming interface (API) calls 808 through the software stack and receive a response as messages 812. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
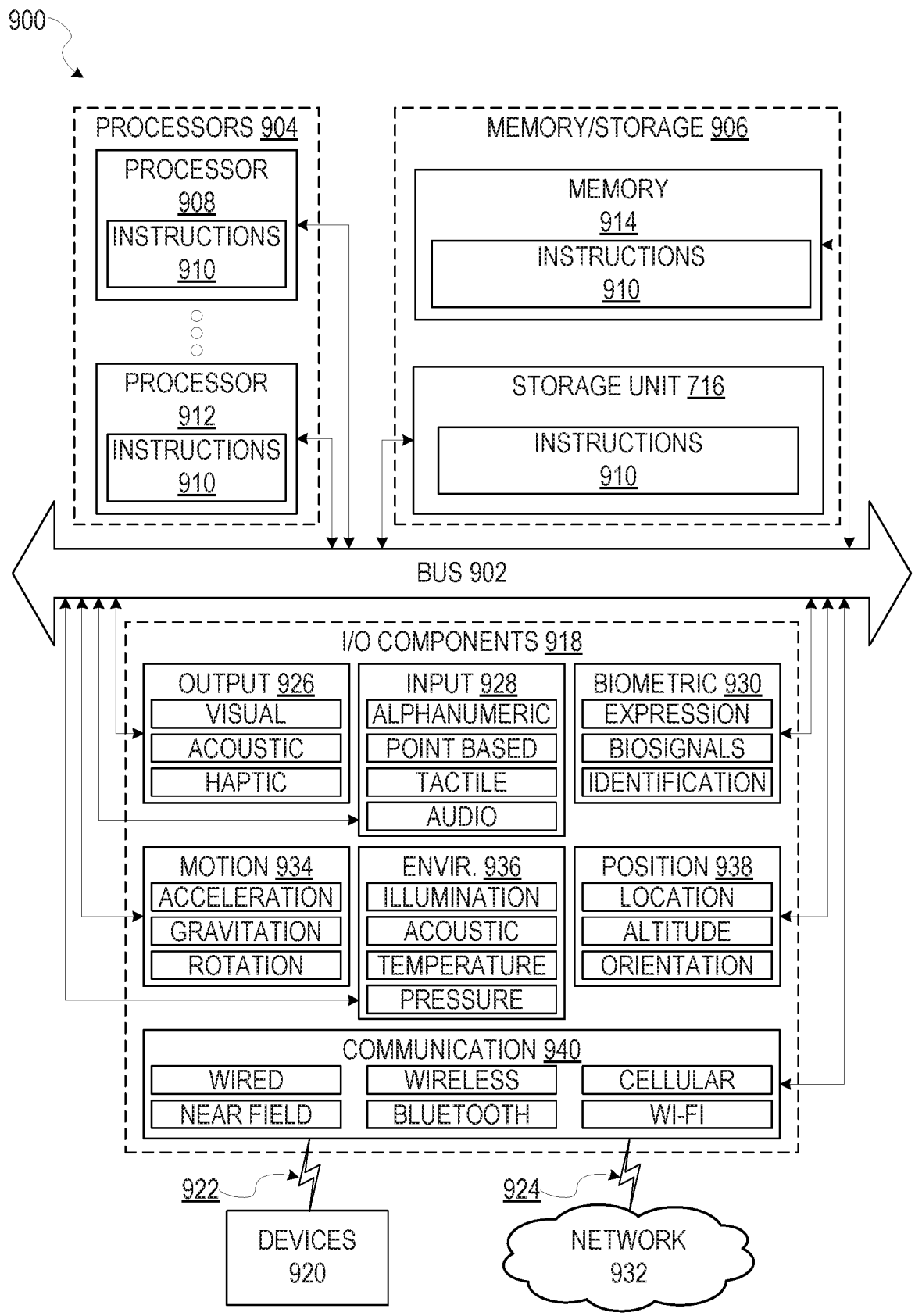
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

As used herein, ephemeral message can refer to a message that is accessible for a time-limited duration (e.g., maximum of 10 seconds). An ephemeral message may comprise a text content, image content, audio content, video content and the like. The access time for the ephemeral message may be set by the message sender or, alternatively, the access time may be a default setting or a setting specified by the recipient. Regardless of the setting technique, an ephemeral message is transitory. A message duration parameter associated with an ephemeral message may provide a value that determines the amount of time that the ephemeral message can be displayed or accessed by a receiving user of the ephemeral message. An ephemeral message may be accessed or displayed using a messaging client software application capable of receiving and displaying content of the ephemeral message, such as an ephemeral messaging app provided by SNAPCHAT.

As also used herein, an ephemeral message story can refer to a collection of ephemeral message content that is accessible for a time-limited duration, similar to an ephemeral message. An ephemeral message story may be sent from one user to another, and may be accessed or displayed using a messaging client software application capable of receiving and displaying the collection of ephemeral content, such as an ephemeral messaging app provided by SNAPCHAT.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT, INC., All Rights Reserved.

What is claimed is:

1. A method comprising:
providing, by one or more hardware processors, a web page to a web client software application on a client device, the web page including a web page module, the web page module being configured to detect an installation status of a specific software application in response to a request through the web page, from a user on the client device, to perform a user-selected operation on the client device using the specific software application, the user-selected operation being selected on the client device by a user selection through the web page module;
receiving from the web page module, by the one or more hardware processors, user device data over a network connection, the user device data including a set of parameters, the set of parameters comprising a first subset of parameters that specifies the user-selected operation to be performed on the client device by the specific software application, the set of parameters comprising a second subset of parameters that includes a single character string, the set of parameters comprising a third subset of parameters that specifies an option for the user-selected operation, the option comprising the specific software application will terminate after performance of the user-selected operation, the set of parameters comprising a fourth subset of parameters that specifies information regarding the user selection of the user-selected operation, the fourth subset of parameters comprising a universal resource locator (URL) to the web page that includes the web page module, the fourth subset of parameters comprising a time-stamp of the user selection of the user-selected operation, the time-stamp being separate from the URL, the single character string combining an identifier associated with the client device and at least one parameter of the set of parameters, the at least one parameter to be loaded on the client device and used by the specific software application; and
storing, by the one or more hardware processors, the set of parameters associated with the user-selected operation to a database in association with the identifier.

2. The method of claim 1, comprising:
receiving, by the one or more hardware processors, a request from the specific software application installed on the client device over the network connection; and
in response to the request received, providing, by the one or more hardware processors, the specific software application with the stored set of parameters from the database, the stored set of parameters being identified based on a particular identifier included in the request.

3. The method of claim 2, wherein the providing the client device with the stored set of parameters from the database comprises:
retrieving, from the database, the stored set of parameters based on the particular identifier included by the request; and
sending the retrieved set of parameters to the specific software application.

4. The method of claim 1, wherein the identifier comprises at least one network address associated with the client device, the at least one network address comprises at least one of a media access controller (MAC) network address associated with the client device, a public Internet Protocol (IP) network address assigned to the client device, or a private IP network address assigned to the client device.

5. The method of claim 1, wherein storing the set of parameters to the database in association with the identifier comprises storing the single character string in a record in the database.

6. A method comprising:
accessing, by a web client software application on a client device, over a network connection, a web page that includes a web page module, the web page module being configured to detect an installation status of a specific software application in response to a request through the web page, from a user on the client device, to perform a user-selected operation on the client device using the specific software application, the user-selected operation being selected on the client device by a user selection through the web page module;

receiving, by user interaction with the web client software application, the request through the web page;

determining, by the web page module, that the specific software application is installed on the client device; and in response to determining that the specific software application is not installed on the client device:

storing, by the web page module, user device data on a server, the user device data including a set of parameters, the set of parameters comprising a first subset of parameters that specifies the user-selected operation to be performed on the client device by the specific software application, the set of parameters comprising a second subset of parameters that includes a single character string, the set of parameters comprising a third subset of parameters that specifies an option for the user-selected operation, the option comprising the specific software application will terminate after performance of the user-selected operation, the set of parameters comprising a fourth subset of parameters that specifies information regarding the user selection of the user-selected operation, the fourth subset of parameters comprising a universal resource locator (URL) to the web page that includes the web page module, the fourth subset of parameters comprising a time-stamp of the user selection of the user-selected operation, the time-stamp being separate from the URL, the single character string combining an identifier associated with the client device and at least one parameter of the set of parameters, the at least one parameter to be loaded on the client device and used by the specific software application; and directing, by the web page module, the web client software application to a resource for installing the specific software application on the client device.

7. The method of claim 6, comprising:

in response to determining that the specific software application is installed on the client device, launching, by the web page module, the specific software application on the client device such that the specific software application loads at least one parameter of the second subset of parameters based on the user-selected operation, the at least one parameter in the loaded parameter causing the specific software application to perform the user-selected operation on the client device.

8. The method of claim 6, the storing the user device data on the server comprises:

determining, by the web page module, the identifier associated with the client device.

9. The method of claim 6, wherein the identifier comprises at least one network address associated with the client device.

10. The method of claim 9, wherein the at least one network address comprises at least one of a Media Access Controller (MAC) network address associated with the client device, a public Internet Protocol (IP) network address assigned to the client device, or a private IP network address assigned to the client device.

11. The method of claim 6, the storing the user device data on the server comprises:

determining, by the web page module, the set of parameters associated with the user-selected operation based on a user selection through the web page module.

12. The method of claim 6, wherein the resource comprises an application store software application installed on the client device, the application store software application facilitating installation of the specific software application on the client device.

13. The method of claim 6, wherein the resource comprises another web page that facilitates installation of the specific software application on the client device.

14. The method of claim 6, comprising, in response to determining that the specific software application is not installed on the client device, and subsequent to the specific software application being installed and launched on the client device as an installed software application, the installed software application:

sending a search request to the server for at least one parameter associated with the user-selected operation, the search request including a particular identifier determined for the client device by the installed software application;

in response to the search request, receiving a copy of the set of parameters from the server, the copy of the set of parameters being associated with the user-selected operation; and causing the installed software application to load the copy of the set of parameters, at least one parameter in the copy of the set of parameters causing the installed software application to perform the user-selected operation.

15. The method of claim 14, wherein the receiving the copy of the set of parameters from the server comprises receiving a single character string that combines the particular identifier of the search request with the copy of the set of parameters.

16. The method of claim 6, wherein storing the user device data on the server comprises storing the single character string in a database record.

17. A server device comprising:

a memory storing instructions; and a hardware processor communicatively coupled to the memory and configured by the instructions to perform operations comprising:

providing a client device with a web page including a web page module, the web page module being configured to detect an installation status of a specific software application in response to a request through the web page, from a user on the client device, to perform a user-selected operation on the client device using the specific software application, the user-selected operation being selected on the client device by a user selection through the web page module;

receiving user device data from the web page module, the user device data including a set of parameters comprising a first subset of parameters that specifies the user-selected operation to be performed on the client device by the specific software application, the set of parameters comprising a second subset of parameters that includes a single character string, the set of parameters comprising a third subset of parameters that specifies an option for the user-selected operation, the option comprising the specific software application will terminate after performance of the user-selected operation, the set of parameters comprising a fourth subset of parameters that specifies information regarding the user selection of the user-selected operation, the fourth subset of parameters comprising a universal resource locator (URL) to the web page that includes the web page module, the fourth subset of parameters comprising a time-stamp of the user selection of the user-selected operation, the time-stamp being separate from the URL, the single character string combining an identifier associated with the client device and at least one parameter of the set of parameters, the at least one parameter to be loaded on the client device and used by the specific software application; and storing the set of parameters associated with the user-selected operation to a database in association with the identifier.

18. A device comprising:

a memory storing instructions; and a hardware processor communicatively coupled to the memory and configured by the instructions to perform operations comprising:

accessing, by a web client software application, over a network connection, a web page that includes a web page module, the web page module being configured to detect whether a specific software application installed on the device is unable to perform a user-selected operation, the web page module being configured to perform the detecting in response to a request through the web page, from a user on the device, to perform the user-selected operation on the device using the specific software application, the user-selected operation being selected on the device by a user selection through the web page module;

receiving, by user interaction with the web client software application, the request through the web page;

determining, by the web page module, whether the specific software application installed on the device is unable to perform the user-selected operation; and in response to determining that the specific software application installed on the device is unable to perform the user-selected operation:

storing, by the web page module, user device data on a server, the user device data including a set of parameters comprising a first subset of parameters that specifies a user-selected operation to be performed on a client device by the specific software application, the set of parameters comprising a second subset of parameters that includes a single character string, the set of parameters comprising a third subset of parameters that specifies an option for the user-selected operation, the option comprising the specific software application will terminate after performance of the user-selected operation, the set of parameters comprising a fourth subset of parameters that specifies information regarding the user selection of the user-selected operation, the fourth subset of parameters comprising a universal resource locator (URL) to the web page that includes the web page module, the fourth subset of parameters comprising a time-stamp of the user selection of the user-selected operation, the time-stamp being separate from the URL, the single character string combining an identifier associated with the client device and at least one parameter of the set of parameters, the at least one parameter to be loaded on the client device and used by the specific software application; and directing, by the web page module, device to a resource that facilitate installation of the specific software application.

19. The device of claim 18, wherein the operations comprise:

in response to determining that the specific software application installed on the device is unable to perform the user-selected operation and subsequent to the specific software application being launched on the client device as an installed software application after the device has been directed to the resource by the web page module, causing the installed software application to:

determine, by the web page module, a particular identifier for the device;

search, by the web page module, the server for at least one parameter based on the particular identifier; and in response to finding the at least one parameter on the server, obtain the set of parameters and load the obtained set of parameters by the installed software application, the at least one parameter being associated with the user-selected operation selected to be performed on the client device, causing the installed software application to perform the user-selected operation on the client device.

* * * * *